(12) United States Patent
Hyun et al.

(10) Patent No.: US 7,957,281 B2
(45) Date of Patent: Jun. 7, 2011

(54) METHOD FOR INTERWORKING BETWEEN ACCESS CONTROL ROUTER AND POSITION DETERMINATION ENTITY IN POSITION RECOGNITION SYSTEM BASED ON PORTABLE INTERNET AND SYSTEM THEREFOR

(75) Inventors: Moon-Pil Hyun, Suwon-si (KR); Hee Jung, Ansan-si (KR); Jin-Won Kim, Seoul (KR); In-Jae You, Suwon-si (KR); Sung-Bae Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 898 days.

(21) Appl. No.: 11/835,240

(22) Filed: Aug. 7, 2007

(65) Prior Publication Data

US 2008/0039118 A1    Feb. 14, 2008

(30) Foreign Application Priority Data

Aug. 10, 2006    (KR) .................. 10-2006-0075767

(51) Int. Cl.
*H04L 12/26* (2006.01)
*H04W 24/00* (2009.01)
*G06F 15/173* (2006.01)

(52) U.S. Cl. ................... 370/230; 455/456.1; 709/225

(58) Field of Classification Search .................. None
See application file for complete search history.

(56) References Cited

U.S. PATENT DOCUMENTS

| | | | |
|---|---|---|---|
| 6,377,810 B1 * | 4/2002 | Geiger et al. | 455/456.2 |
| 6,789,118 B1 * | 9/2004 | Rao | 709/225 |
| 2005/0198169 A1 * | 9/2005 | Holten et al. | 709/206 |
| 2006/0063537 A1 * | 3/2006 | Lee et al. | 455/456.1 |
| 2006/0161639 A1 * | 7/2006 | Kato | 709/219 |
| 2009/0131076 A1 * | 5/2009 | Moeglein et al. | 455/456.1 |

FOREIGN PATENT DOCUMENTS

| | | |
|---|---|---|
| KR | 1020030060195 | 7/2003 |
| KR | 1020040055034 | 6/2004 |
| KR | 1020050090731 | 9/2005 |
| KR | 1020060122055 | 11/2006 |

* cited by examiner

*Primary Examiner* — Ricky Ngo
*Assistant Examiner* — Clemence Han
(74) *Attorney, Agent, or Firm* — The Farrell Law Firm, P.C.

(57) ABSTRACT

Disclosed is a method for interworking between an ACR and a PDE in a position recognition system based on a portable Internet and a system therefor. A scheme for TCP/IP-based socket connection between the PDE and the ACR is defined. A data packet transmitted and received between the PDE and the ACR is also defined so that the PDE can receive a necessary measurement value from the ACR during position determination. The definition of the interworking between the ACR and the PDE serves as a basis for accommodating various services.

8 Claims, 12 Drawing Sheets

| Header (11bytes) | | | | | Data (4085bytes) |
|---|---|---|---|---|---|
| ID (7bytes) | | | | Length (4bytes) | |
| SrcPlatform | DstPlatform | MsgID | SeqID | Data length | |
| 1bytes | 1bytes | 1bytes | 4bytes | | |

FIG.5

| Packet name | MsgID | Detailed description |
|---|---|---|
| Heart Beat Request | 0x31 | ACR's alive condition request |
| Heart Beat Response | 0x32 | ACR's alive condition response |
| Pilot Measure Request | 0x33 | Data request necessary for position determination |
| Pilot Measure Response | 0x34 | Data response necessary for position determination |

FIG.6

| Packet name | Data | | | |
|---|---|---|---|---|
| Heart Beat Request | Field name | Type | Byte | Detailed description |
| | Heart Beat Seq | int | 4 | Heart Beat Request Sequence |

FIG.7

| Packet name | Data | | | |
|---|---|---|---|---|
| Heart Beat Response | Field name | Type | Byte | Detailed description |
| | Heart Beat Seq | int | 4 | Heart Beat Request Sequence |
| | ACR status | byte | 1 | ACR server's condition<br>0x00 : Normal<br>0x01 : Abnormal |

| Packet name | Data | | | |
|---|---|---|---|---|
| Pilot Measure Request | Field name | Type | Byte | Detailed description |
| | PSS ID Type | byte | 1 | PSS ID Type<br>0x01 : NAI<br>0x02 : MAC Address<br>0x03 : IP Address<br>0x04 ~ : Reserved |
| | PSS ID Size | int | 4 | Length of PSS ID character string |
| | PSS ID | string | 50 | Value of PSS ID |
| | Request Type | byte | 1 | Service classification type<br>0x01 : Normal service<br>0x02 : Emergency service |

FIG.10

| Packet name | Data | | | |
|---|---|---|---|---|
| Pilot Measure Response | Field name | Type | Byte | Detailed description |
| | PSS ID Type | byte | 1 | PSS ID Type<br>0x01 : NAI<br>0x02 : MAC Address<br>0x03 : IP Address<br>0x04 ~ : Reserved |
| | PSS ID Size | int | 4 | Length of PSS ID character string |
| | PSS ID | string | 50 | Value of PSS ID |

FIG.11

| 4byte | 4byte | 4byte | 4byte | 4byte | 8byte | 4byte | 4byte | 4byte |
|---|---|---|---|---|---|---|---|---|
| Serving BS ID | | | | Scan Count Int | BS Relative Delay | BS RTD | BS CINR | BS RSSI |
| ACR ID Int | RAS ID Int | FA ID Int | Sector ID Int | | | | | |
| | | | | | Relative Delay 00 | RTT 00 | CINR 00 | RSSI 00 |
| | | | | | Relative Delay 01 | RTT 01 | CINR 01 | RSSI 01 |
| | | | | | ... | ... | ... | ... |
| | | | | | Relative Delay 30 | RTT 30 | CINR 30 | RSSI 30 |

FIG.12

| Error Code | Detailed description |
|---|---|
| 0x01 | Message parsing error (when ACR does not conform to a defined standard) |
| 0x02 | PSS ID Type error (in case of undefined PSS ID Type) |
| 0x03 | When PSS ID value is different from defined PSS ID Type |
| 0x04 | When PSS ID value is out of range of valid ID values |
| 0x05 | When not defined MsgID |
| 0x06 | When PSS ID does not exist in current ACR |
| 0x07 | When PSS ID exists in current ACR, but fails to be searched |
| 0x08 | When request processing exceeds time limit determined by ACR |
| 0x09 | When the number of allowable requests of ACR is exceeded and the requests are dropped |
| 0x0A ~ | Reserved |

FIG.13

METHOD FOR INTERWORKING BETWEEN ACCESS CONTROL ROUTER AND POSITION DETERMINATION ENTITY IN POSITION RECOGNITION SYSTEM BASED ON PORTABLE INTERNET AND SYSTEM THEREFOR

PRIORITY

This application claims priority to an application entitled "Method for Interworking between Access Control Router and Position Determination Entity in Position Recognition System Based on Portable Internet and System Therefor" filed in the Korean Intellectual Property Office on Aug. 10, 2006 and assigned Serial No. 2006-75767, the contents of which are hereby incorporated by reference.

BACKGROUND OF THE INVENTION

1. Field of the Invention

The present invention relates to a position recognition system based on a portable Internet. More particularly, the present invention relates to a method for interworking between an ACR (Access Control Router) and a PDE (Position Determination Entity) in a position recognition system based on a portable Internet and a system therefor.

2. Description of the Related Art

A recently developed portable Internet system can complement both a mobile communication system, which has nationwide coverage and high-speed mobility, and wireless LAN (Local Area Network), which supports indoor ultra-high speed transmission. The portable Internet system enables users on the move to access the Internet at a high transmission rate anywhere and anytime by means of portable wireless terminals so that they can obtain or utilize information and content.

Figure 1:
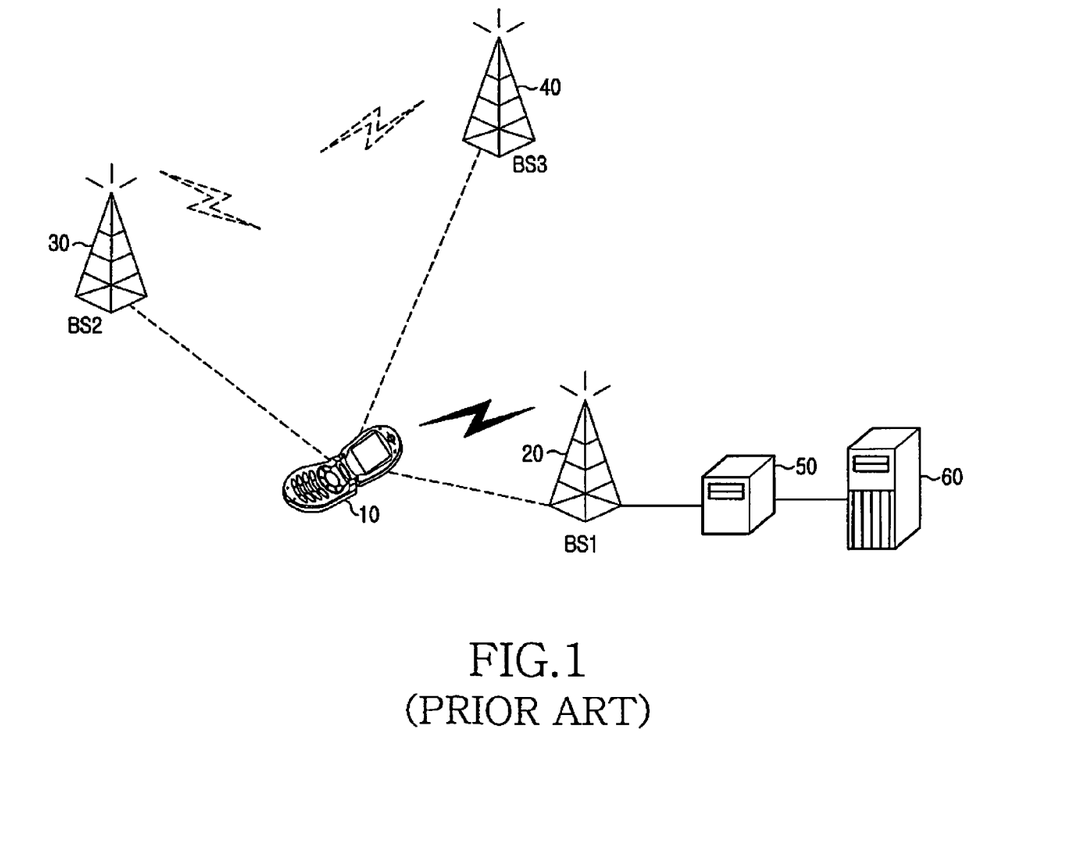
FIG. 1 shows the construction of a conventional position recognition system.

A position recognition system based on portable Internet signals has a construction as shown in FIG. 1. Referring to FIG. 1, the position recognition system includes a PSS (Portable Subscriber Station) 10, base stations 20 to 40, an ACR 50, and a PDE 60.

The PSS 10 gathers position determination information, which is necessary for position determination, and transmits the information to the PDE 60 through a main base station 20 and the ACR 50. The PDE 60 receives the position determination information from the PSS 10 and calculates the position of the PSS 10 by means of triangulation.

Such a position recognition system is expected to provide a number of new services which have hardly or never been applied to systems based on the portable Internet. To this end, respective components of the position recognition system are supposed to incorporate more functions. However, there has been no standard regarding the position recognition based on the portable Internet. Particularly, the interworking between the PDE and the ACR has never been defined. In order to provide more diversified services in a position recognition system, there is a need to define the interworking between an ACR and a PDE, which constitute the position recognition system.

SUMMARY OF THE INVENTION

Accordingly, the present invention has been made to solve at least the above-mentioned problems occurring in the prior art, and an aspect of the present invention is to provide a method for interworking between an ACR and a PDE in a position recognition system based on a portable Internet and a system therefor, wherein the relation between the ACR and the PDE is defined so as to accommodate various services.

In order to accomplish this aspect, there is provided a method for interworking between an access control router and a position determination entity in a position recognition system based on portable Internet, the method including requesting by the position determination entity that the access control router establishes a socket connection; determining if a connection response is received in response to the request within a predetermined period of time; transmitting an an alive request regarding a currently connected port when it is determined that the connection response has been received; transmitting to the access control router a message for requesting a position determination at a position determination request after receiving a response to the alive request; and performing the position determination by using a measurement value contained in a response to the position determination request after receiving the response.

In accordance with another aspect of the present invention, there is provided a position recognition system based on a portable Internet for interworking between an access control router and a position determination entity, the system including a position determination entity for transmitting a connection request for a socket connection, determining if a connection response is received within a predetermined period of time, transmitting alive request regarding a currently connected port when it is determined that the connection response has been received, transmitting a position determination request message in response to a position determination request after receiving a response to the alive request, and performing position determination by using a measurement value contained in a position determination response message after receiving the position determination response message; an access control router for transmitting a connection response to the connection request of the position determination entity, transmitting a response to the alive request when the access control router is in a normal condition after receiving the alive request, forwarding the position determination request message to a portable subscriber station after receiving the position determination request message, and forwarding a position determination response message to the position determination entity after receiving the position determination response message in response to the position determination request message; and a base station for receiving the position determination request message from the access control router, transmitting the position determination request message to the portable subscriber station, providing the portable subscriber station with information regarding neighboring base stations, and transmitting the position determination response message from the portable subscriber station to the access control router.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. It should be noted that similar components are designated by similar reference numerals although they are illustrated in different drawings. Furthermore, in the following description of the present invention, a detailed description of known functions and configurations incorporated herein is omitted to avoid making the subject matter of the present invention unclear.

The present invention implements an interworking function between an ACR and a PDE in a position recognition system based on the portable Internet. To this end, the present invention defines a TCP/IP (Transmission Control Protocol/Internet Protocol)-based socket connection scheme between the PDE and the ACR, as well as a data packet transmitted and received between these entities so that the PDE can receive a necessary measurement value from the ACR during a position determination. The definition of the interworking between the ACR and the PDE serves as a basis for accommodating various services.

Figure 2A:
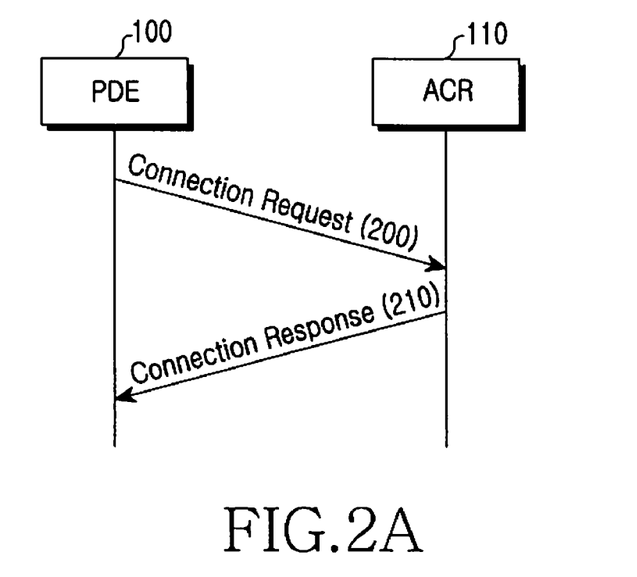
FIG. 2A is a signal flow chart illustrating the signal flow during a normal connection procedure between a PDE and an ACR according to the present invention.
Figure 2B:
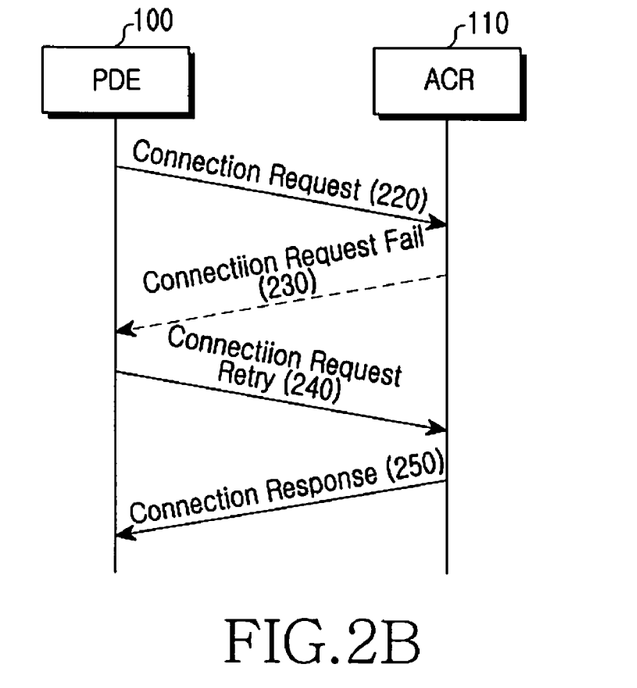
FIG. 2B is a signal flow chart illustrating the signal flow during an abnormal connection procedure between a PDE and an ACR according to the present invention.

A connection procedure between an ACR and a PDE according to the present invention will now be described with reference to FIGS. 2A and 2B. FIG. 2A shows the flow of signals during a normal connection procedure between a PDE and an ACR according to the present invention, and FIG. 2B shows the flow of signals during an abnormal connection procedure between a PDE and an ACR according to the present invention.

The following description discloses how the ACR and the PDE must interwork with each other during operation and how data transmitted between the PDE and the ACR should be constructed.

The TCP/IP connection for interworking between the PDE and the ACR follows a socket connection procedure. As used herein, the socket connection procedure refers to a procedure for initial connection trial while the PDE and the ACR are not connected to each other.

Referring to FIG. 2A, in step 200, the PDE 100 transmits to the ACR 110 a connection request, which requests a socket connection in order to provide a service. In step 210, if the PDE 100 receives a connection response from the ACR 110 after transmitting the connection request, the PDE 100 recognizes that the connection is successfully established, thereby communicating with the ACR 110.

Referring to FIG. 2B, in step 220 the PDE 100 transmits a connection request to the ACR 110 and, if the PDE 100 fails to receive a connection response even after a predetermined period of time has passed (in step 230), the PDE 100 takes a time-out. The PDE 100 retries the transmission of a connection request in step 240. If the PDE 100 receives a connection response in step 250 as a result of the retrial, the PDE 100 can communicate with the ACR 110.

The retrial is repeated up to a maximum of three times. If the PDE 100 fails to receive the connection response even after transmitting the connection request more than three times, the PDE 100 recognizes that a connection failure has occurred and retries a socket connection via a standby port. If the connection via the standby port still fails, the PDE 100 reports the failure to the administrator.

Figure 3:
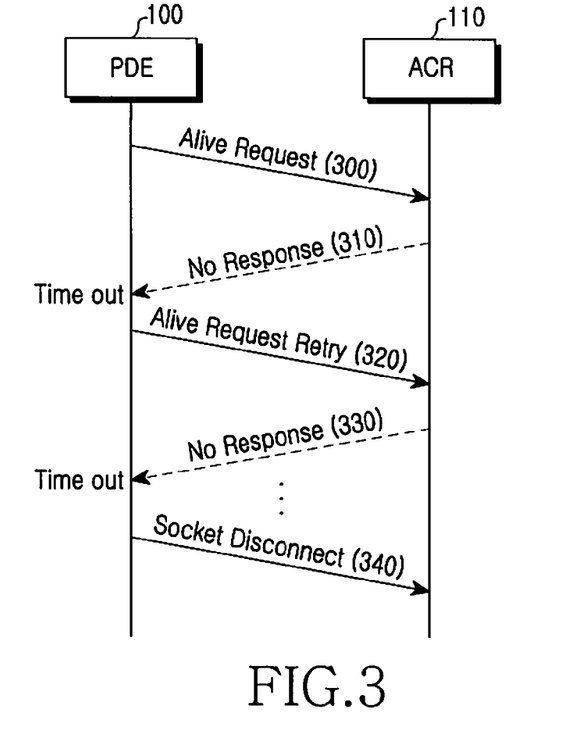
FIG. 3 shows the flow of signals transmitted/received when a response to an "alive" request fails to be received according to the present invention.

A process in which the PDE 100 checks if the ACR 110 is alive on line or alive will now be described with reference to FIGS. 3 and 4. FIG. 3 shows the flow of signals transmitted/received when a response to a alive request fails to be received according to the present invention, and FIG. 4 shows the flow of signals transmitted/received when a response to a alive request is successfully received according to the present invention.

Referring to FIG. 3, in step 300, the PDE 100 transmits a alive request to the ACR 110 in order to inquire the condition of the ACR 110. Then, the PDE 100 waits for a response from the ACR 110 for a predetermined period of time. If the ACR 110 is in a normal condition, it transmits a alive response to the PDE 100. If the PDE 100 fails to receive a response even after the predetermined period of time has passed, the PDE 100 takes a time-out in step 310. In step 320, the PDE 100 retransmits a alive request to the ACR 110 in order to again inquire the condition of the ACR 110. If the PDE 100 fails to receive a response to this request, the PDE 100 takes a time-out once more in step 330. When the PDE 100 still fails to receive a response even after a predetermined number of retransmission attempts, the PDE 100 takes a time-out and transmits a socket disconnection request so as to force the current port to close in step 340.

Figure 4:
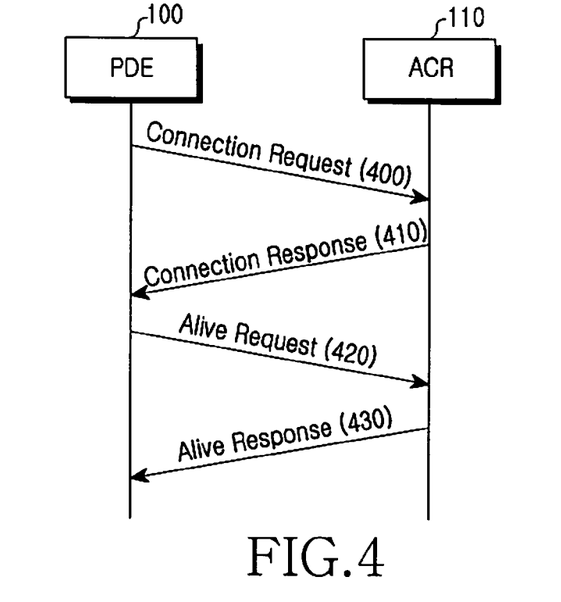
FIG. 4 is a signal flow chart illustrating the signal flow transmitted/received when a response to an "alive" request is successfully received according to the present invention.

After the socket connection regarding the current port is released, the PDE 100 performs an operation as shown in FIG. 4.

Referring to FIG. 4, the PDE 100 retries a socket connection via the standby port. Particularly, in step 400, the PDE 100 transmits a connection request to the ACR 110 in order to request a socket connection via the standby port. If the PDE 100 receives a connection response from the ACR 110 in step 410 after transmitting the connection request, the PDE 100 recognizes that a connection has been successfully established, and can communicate with the ACR 110. The PDE 100 transmits a alive request in step 420 and receives a alive response to the request in step 430. This enables communication between the PDE 100 and the ACR 110 via a port, which has been conformed to be alive.

Figure 5:
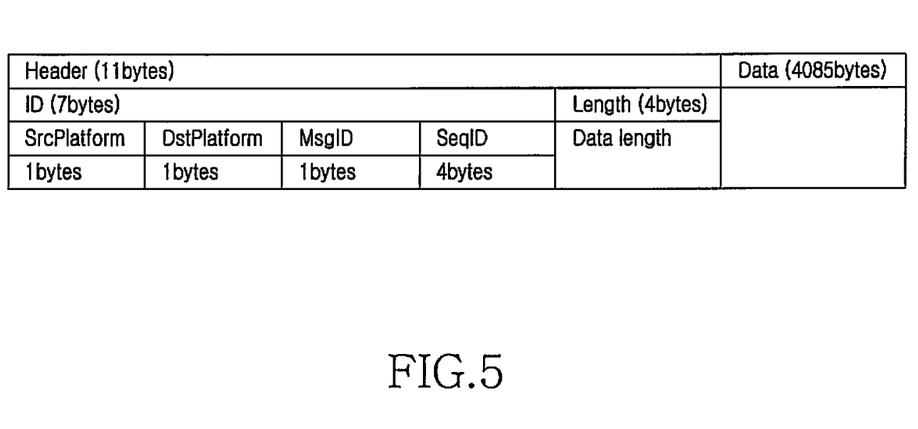
FIG. 5 shows the structure of a packet transmitted/received between a PDE and an ACR according to the present invention.

FIG. 5 shows the structure of a packet transmitted/received between a PDE 100 and an ACR 110 according to the present invention. Such a packet structure is composed of a header and data. The header structure is defined as follows: an "SrcPlatform" field represents the platform ID of the packet transmission side; a "DstPlatform" field represents the platform ID of the packet receipt side; an "MsgID" field represents the service characters of the packet (e.g. alive, request, response, etc); and an "SeqID" field represents the sequence ID of the packet.

Figure 6:
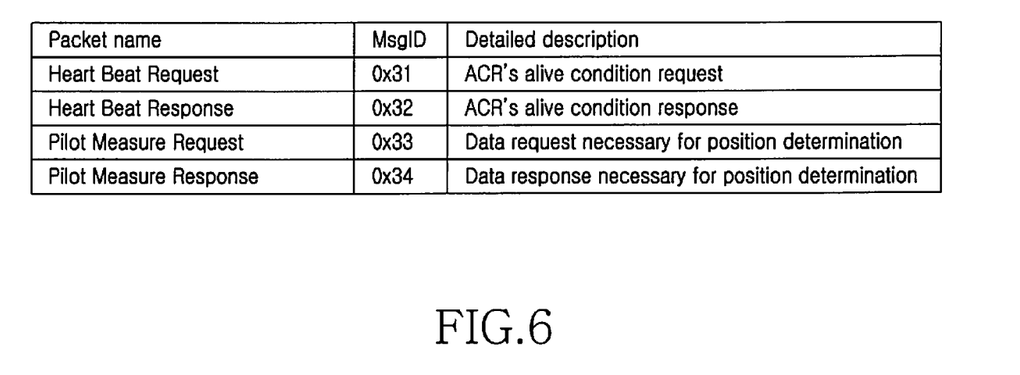
FIG. 6 shows descriptions of packet services classified according to their hexagonal value filling an MsgID field shown in FIG. 5.
Figure 7:
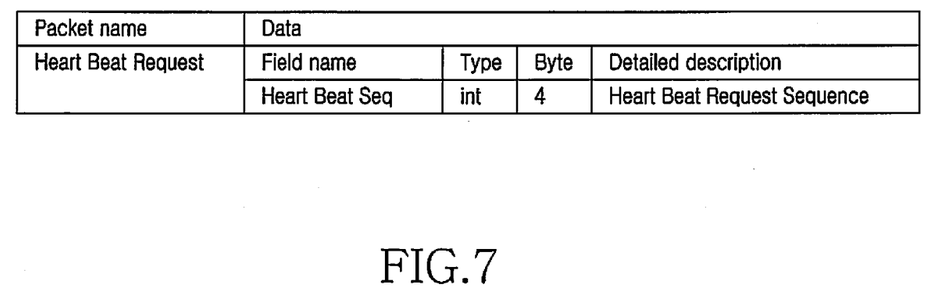
FIG. 7 shows a packet structure regarding a alive request according to the present invention.
Figure 8:
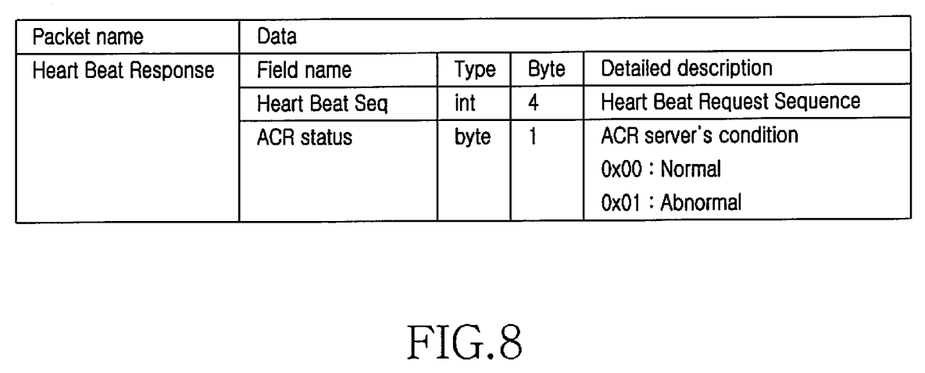
FIG. 8 shows a packet structure regarding a alive response according to the present invention.

Packet services used in the present invention are classified as defined in FIG. 6, which shows classification of packet services according to the hexagonal value filling the MsgID field shown in FIG. 5. For example, the PDE 100 transmits a packet having a hexagonal value "0x31" in the MsgID field so as to ascertain if the ACR 110 is alive. In this manner, a request message for ascertaining if the ACR 110 is alive, i.e. a alive request, has a packet structure as shown in FIG. 7. A response message for ascertaining that the ACR 110 is alive, i.e. a alive response, has a structure as shown in FIG. 8.

After a socket connection is established between the PDE 100 and the ACR 110 and packet transmission becomes possible via the current port in this manner, the PDE 100 can start the position determination.

Figure 9:
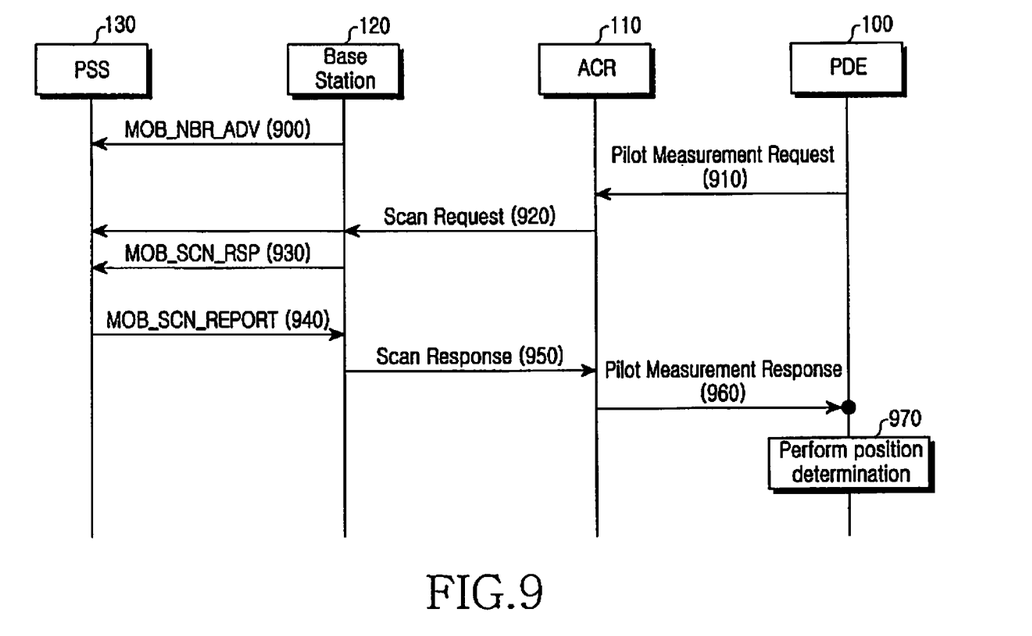
FIG. 9 is a flowchart showing a position determination process according to the present invention.

A position determination process according to the present invention will now be described with reference to FIG. 9, which is a flowchart of the process. Referring to FIG. 9, a PDE 100 sends a position determination request and, when the PDE 100 transmits a position determination request to a PSS 130, the PSS 130 gathers information necessary for the position determination and retransmits the information to the PDE 100.

Figure 10:
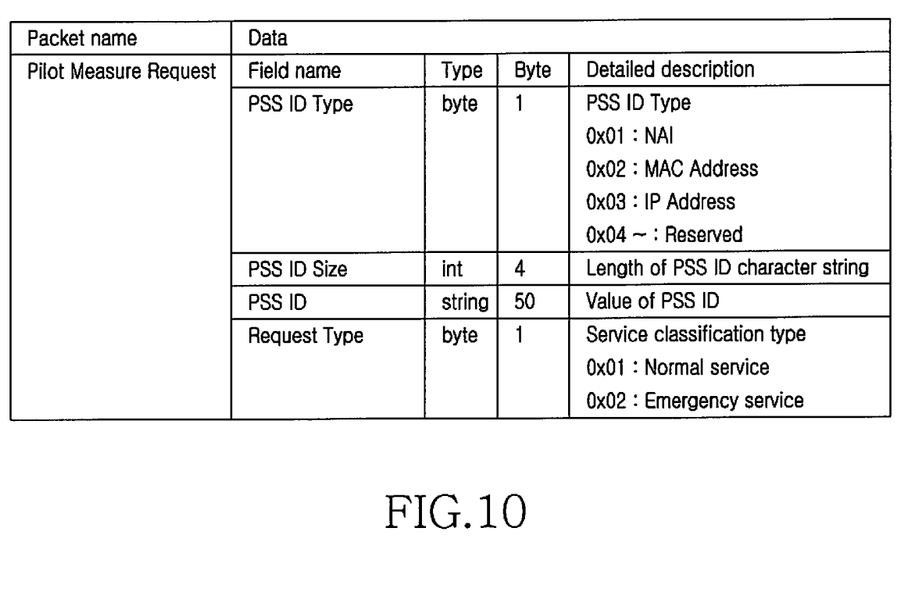
FIG. 10 shows the structure of a pilot measurement request message according to the present invention.

The PSS 130 begins position recognition when the PDE 100 transmits a position determination request message. Particularly, if the PDE 100 determines that it needs to position the PSS 130, in step 910 the PDE 100 transmits a pilot measurement request message (i.e. a position determination request message) to the ACR 110 via a port, which has been confirmed to be alive currently. The pilot measurement request message includes one of an NAI (Network Access Identifier) address, an MAC (Media Access Control) address, and an IP (Internet Protocol) address. The structure of the pilot measurement request message is shown in FIG. 10.

Upon receiving the pilot measurement request message, the ACR 110 transmits a scan request message to the PSS 130 via a base station 120 in step 920. Prior to this step, in step 900 the main base station periodically broadcasts an MOB_N-BR_ADV message, which includes information regarding neighboring base stations, while transferring a scan request message to the PSS 130.

After receiving the scan request message, the PSS 130 is aware of the position determination request of the PDE 100. The PSS 130 can scan neighboring base stations, which are necessary for position determination, by using the scan request message from the base station 120. In this case, the PSS 130 may receive the MOB_NBR_ADV message, which is periodically transmitted from the base station, before the scan request message arrives. Alternatively, the PSS 130 may receive the MOB_NBR_ADV message as desired after the scan request message arrives.

Figure 11:
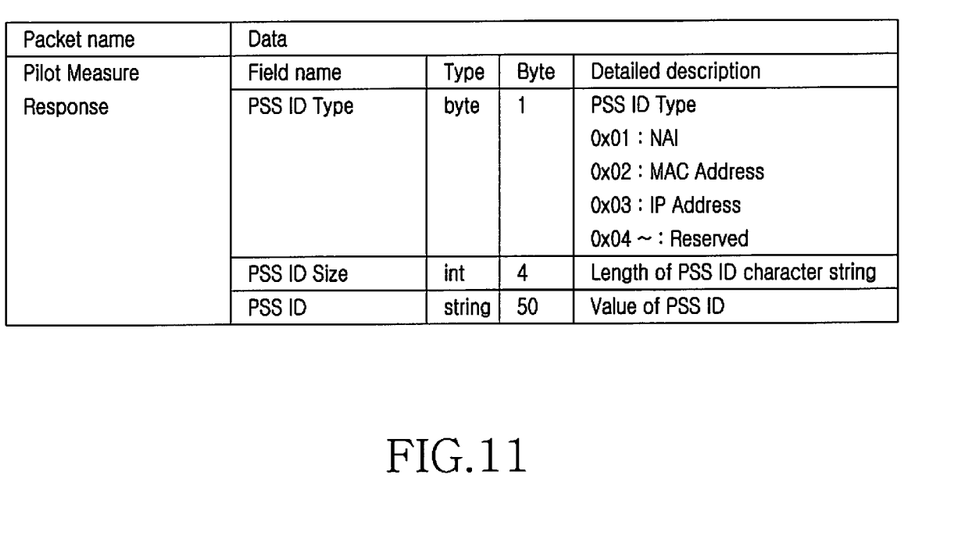
FIG. 11 shows the structure a pilot measurement response message according to the present invention.
Figure 12:
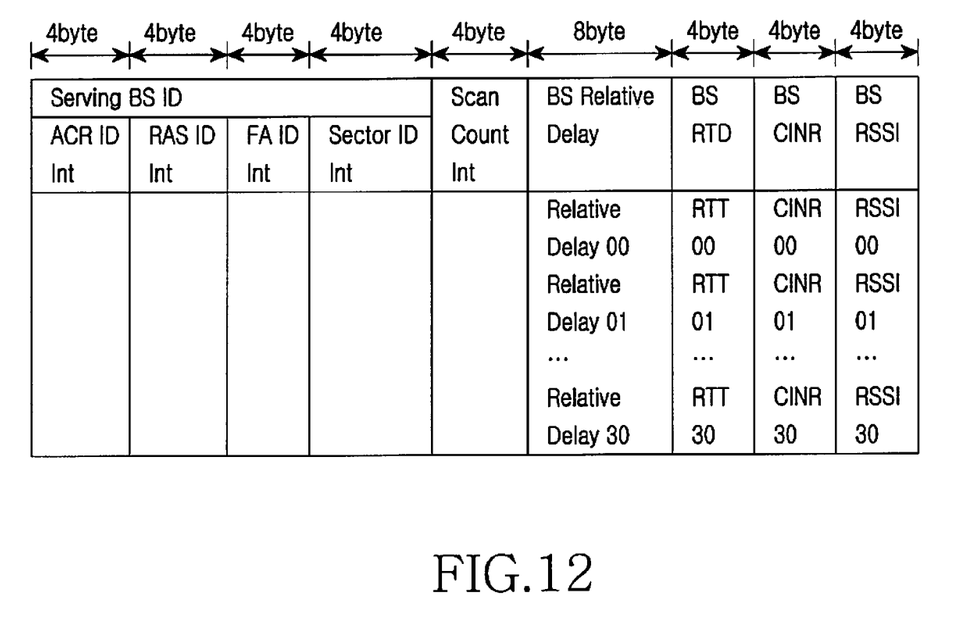
FIG. 12 shows particulars of a pilot measurement field shown in FIG. 11.
Figure 13:
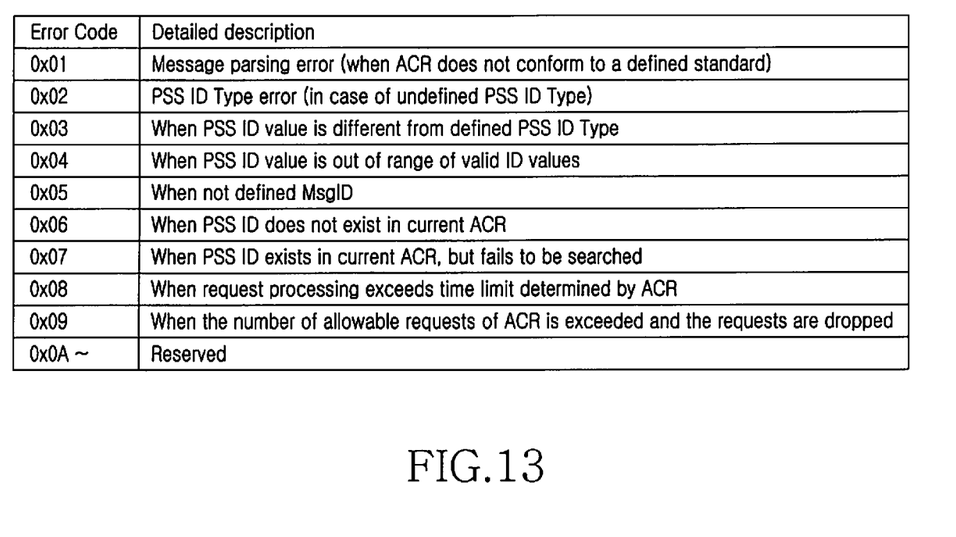
FIG. 13 shows particulars of an error code field shown in FIG. 11.

In step 940, the PSS 130 loads the scan results onto the MOB_SCN_REPORT message and transmits the message to the base station 120. In step 950, the base station 120 transmits to the ACR 110 a scan response message, which contains the scan results. In step 960, the ACR 110 transmits a pilot measurement response message to the PDE 100. The structure of the pilot measurement response message is shown in FIG. 11. Particulars of a pilot measurement field are shown in FIG. 12, and those of an error code field are shown in FIG. 13.

As such, the PDE 100 receives the MOB_SCN_REPORT message, extracts information necessary to position the PSS 130, and performs operations for positioning the PSS 130 in step 970.

In summary, the present invention defines how the PDE and the ACR, which are major components of a position recognition system based on the portable Internet, should interwork with each other during operation, as well as specifies the structure of packets exchanged between the PDE and the ACR, so as to establish a basis for accommodating various services.

As mentioned above, the present invention is advantageous in that, by defining the interworking between the PDE and the ACR, which are major components of a position recognition system based on the portable Internet, various services are accommodated.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for interworking between an access control router and a position determination entity in a position recognition system based on a portable Internet, the method comprising the steps of:

transmitting, by the position determination entity to the access control router, a socket connection request;

determining, by the position determination entity, if a socket connection response is received in response to the socket connection request within a predetermined period of time after transmitting the socket connection request;

transmitting, by the position determination entity, an alive request regarding a currently connected port, when it is determined that the socket connection response has been received;

transmitting, to the access control router, a position determination request including a message for requesting a position determination, after receiving a response to the alive request;

performing, by the position determination entity, position determination by using a measurement value included in a response to the position determination request;

retransmitting the alive request a predetermined number of times, when the response to the alive request fails to be received within a predetermined period of time after transmitting the alive request; and releasing the socket connection, when the response to the alive request fails to be received, after retransmission is performed the predetermined number of times.

2. A method for interworking between an access control router and a position determination entity in a position recognition system based on a portable Internet, the method comprising the steps of:

transmitting, by the position determination entity to the access control router, a socket connection request;

determining, by the position determination entity, if a socket connection response is received in response to the socket connection request within a predetermined period of time after transmitting the socket connection request;

transmitting, by the position determination entity, an alive request regarding a currently connected port, when it is determined that the socket connection response has been received;

transmitting, to the access control router, a position determination request including a message for requesting a position determination, after receiving a response to the alive request;

performing, by the position determination entity, position determination by using a measurement value included in a response to the position determination request;

waiting for the response to the alive request for a predetermined period of time after transmitting the alive request;

taking a time-out when the response to the alive request fails to be received, after the predetermined period of time has passed; and retransmitting the alive request a predetermined number of times, until the response to the alive request is received.

3. The method as claimed in claim 2, further comprising closing the currently connected port when the response to the alive request fails to be received after the predetermined number of times are exceeded.

4. The method as claimed in claim 3, further comprising:

requesting a socket connection via a standby port, after closing the currently connected port;

transmitting an alive request regarding the standby port, when a connection response is received within a predetermined period of time after requesting the socket connection; and performing a position determination, when a response to the alive request is received within a predetermined period of time after transmitting the alive request.

5. A position recognition system based on a portable Internet for interworking between an access control router and a position determination entity, the system comprising:

a position determination entity for transmitting a connection request for a socket connection, determining if a connection response is received within a predetermined period of time, transmitting an alive request regarding a currently connected port when it is determined that the connection response has been received, transmitting a position determination request message in response to a position determination request after receiving a response to the alive request, and performing a position determination by using a measurement value contained in a position determination response message, after receiving the position determination response message;

an access control router for transmitting the connection response to the connection request of the position determination entity, transmitting the response to the alive request when the access control router is in a normal condition after receiving the alive request, forwarding the position determination request message to a portable subscriber station after receiving the position determination request message, and forwarding the position determination response message to the position determination entity after receiving the position determination response message in response to the position determination request message; and a base station for receiving the position determination request message from the access control router, transmitting the position determination request message to the portable subscriber station, providing the portable subscriber station with information regarding neighboring base stations, and transmitting the position determination response message from the portable subscriber station to the access control router, wherein the position determination entity is adapted to retransmit the alive request a predetermined number of times when the response to the alive request fails to be received within the predetermined period of time, and release the socket connection when the response to the alive request fails to be received after retransmission is performed more than the predetermined number of times.

6. A position recognition system based on a portable Internet for interworking between an access control router and a position determination entity, the system comprising:

a position determination entity for transmitting a connection request for a socket connection, determining if a connection response is received within a predetermined period of time, transmitting an alive request regarding a currently connected port when it is determined that the connection response has been received, transmitting a position determination request message in response to a position determination request after receiving a response to the alive request, and performing a position determination by using a measurement value contained in a position determination response message, after receiving the position determination response message;

an access control router for transmitting the connection response to the connection request of the position determination entity, transmitting the response to the alive request when the access control router is in a normal condition after receiving the alive request, forwarding the position determination request message to a portable subscriber station after receiving the position determination request message, and forwarding the position determination response message to the position determination entity after receiving the position determination response message in response to the position determination request message; and a base station for receiving the position determination request message from the access control router, transmitting the position determination request message to the portable subscriber station, providing the portable subscriber station with information regarding neighboring base stations, and transmitting the position determination response message from the portable subscriber station to the access control router, wherein the position determination entity is adapted to time-out when the response to the alive request fails to be received after the alive request has been transmitted and the predetermined period of time has passed and retransmit the alive request a predetermined number of times until the response to the alive request is received.

7. The system as claimed in claim 6, wherein the position determination entity is adapted to close the currently connected port when the response to the alive request fails to be received even after the predetermined number of times are exceeded.

8. The system as claimed in claim 7, wherein the position determination entity is adapted to request a socket connection via a standby port after closing the currently connected port, transmit an alive request regarding the standby port when a connection response is received within a predetermined period of time after requesting the socket connection, and perform a position determination when a response to the alive request is received within a predetermined period of time.

* * * * *